United States Patent
Radu et al.

(10) Patent No.: US 7,032,954 B2
(45) Date of Patent: Apr. 25, 2006

(54) AUTOMOTIVE ASHTRAY AND METHOD FOR MAKING THE SAME

(75) Inventors: Bogdan Radu, Dearborn, MI (US);
John D. Youngs, Southgate, MI (US);
Mark Heinze, Clarkston, MI (US);
James Gregory, Harrison Township, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/710,499

(22) Filed: Jul. 15, 2004

(65) Prior Publication Data

US 2006/0012216 A1  Jan. 19, 2006

(51) Int. Cl.
*B60J 5/00* (2006.01)

(52) U.S. Cl. ............... 296/146.7; 296/37.9; 296/37.13

(58) Field of Classification Search ............ 296/146.7, 296/37.9, 37.13
See application file for complete search history.

(56) References Cited

U.S. PATENT DOCUMENTS

| | | | |
|---|---|---|---|
| 2,851,585 A | 9/1958 | Glowzinski | |
| 4,552,328 A | 11/1985 | Dutt et al. | 249/67 |
| 4,740,028 A | 4/1988 | Connor | 296/97 |
| 4,902,061 A * | 2/1990 | Plavetich et al. | 296/37.12 |
| 4,919,470 A | 4/1990 | Muller | 296/153 |
| 4,925,072 A * | 5/1990 | Masler et al. | 296/37.9 |
| 5,018,800 A | 5/1991 | Cziptschirsch et al. | 312/344.1 |
| 5,050,922 A * | 9/1991 | Falcoff | 296/37.8 |
| 5,144,963 A | 9/1992 | Dabringhaus et al. | 131/231 |
| 5,199,449 A | 4/1993 | Dabringhaus et al. | 131/231 |
| 5,355,254 A | 10/1994 | Aymerich et al. | 359/844 |
| 5,387,390 A | 2/1995 | Kornylo | 264/46.8 |
| 5,445,430 A | 8/1995 | Nichols | 296/153 |
| 5,489,039 A * | 2/1996 | Brownlie et al. | 220/832 |
| 5,520,313 A * | 5/1996 | Toshihide | 296/37.12 |
| 5,533,772 A | 7/1996 | Volkers et al. | 296/37.9 |
| 5,603,540 A * | 2/1997 | Shibao | 292/341.15 |
| 5,626,382 A | 5/1997 | Johnson et al. | 296/146.7 |
| 5,647,713 A | 7/1997 | Ge et al. | 411/509 |
| 5,671,096 A * | 9/1997 | Yoshida et al. | 359/844 |
| 5,692,711 A | 12/1997 | Tucker | 248/118 |
| 5,780,965 A | 7/1998 | Cass et al. | 313/506 |
| 5,803,415 A | 9/1998 | Konishi et al. | 248/18 |
| 5,902,006 A | 5/1999 | Janker et al. | 296/153 |
| 5,906,409 A | 5/1999 | DeRees et al. | 296/146.7 |
| 5,951,094 A | 9/1999 | Konishi et al. | 296/153 |
| 6,000,822 A | 12/1999 | Polizzi et al. | |
| 6,013,210 A | 1/2000 | Gardner, Jr. | 264/40.1 |
| 6,013,956 A | 1/2000 | Anderson, Jr. | |
| 6,017,617 A | 1/2000 | Gardner, Jr. | 428/309.9 |
| 6,085,953 A * | 7/2000 | Bober et al. | 224/282 |

(Continued)

FOREIGN PATENT DOCUMENTS

DE  4141297  6/1993

(Continued)

*Primary Examiner*—Kiran B. Patel
(74) *Attorney, Agent, or Firm*—Wood, Herron & Evans, L.L.P.

(57) ABSTRACT

The present invention provides for an improved automotive ashtray, and to a two shot molding method for making the same, having a reduced number of parts and that is adapted to be coupled to a substrate of an interior trim assembly, e.g. a door panel, in a vehicle. To this end, the ashtray includes a compartment body and a cover with each including at least one integrally formed connecting member being pivotally coupled together so that the cover may be moved between an open and a closed position for accessing a cavity within the body.

9 Claims, 7 Drawing Sheets

U.S. PATENT DOCUMENTS

| | | |
|---|---|---|
| 6,092,858 A | 7/2000 | Bolwell .................... 296/146.7 |
| 6,106,261 A | 8/2000 | von Holdt .................. 425/130 |
| 6,116,672 A | 9/2000 | Cannon et al. |
| 6,125,030 A * | 9/2000 | Mola et al. ................ 296/37.8 |
| 6,193,399 B1 | 2/2001 | Hulse |
| 6,196,606 B1 | 3/2001 | McGoldrick |
| 6,213,538 B1 | 4/2001 | Scheidmantel et al. ..... 296/153 |
| 6,217,201 B1 | 4/2001 | Hulse |
| 6,248,200 B1 | 6/2001 | Dailey et al. ............... 156/245 |
| 6,248,205 B1 | 6/2001 | Scheidmantel et al. .. 156/309.6 |
| 6,296,796 B1 | 10/2001 | Gordon ...................... 264/255 |
| 6,347,824 B1 | 2/2002 | Akouri et al. ............. 296/97.5 |
| 6,391,232 B1 | 5/2002 | Fritsch ...................... 264/46.6 |
| 6,419,379 B1 | 7/2002 | Hulse |
| 6,464,381 B1 | 10/2002 | Anderson, Jr. et al. |
| 6,470,627 B1 * | 10/2002 | Fukuo ........................ 49/260 |
| 6,536,928 B1 | 3/2003 | Hein et al. |
| 6,544,449 B1 | 4/2003 | Gardner ..................... 264/46.5 |
| 6,562,275 B1 | 5/2003 | Martinez ................... 264/308 |
| 6,583,359 B1 * | 6/2003 | Cabello-Colón ............. 174/66 |
| 6,594,417 B1 | 7/2003 | Hulse |
| 6,629,716 B1 * | 10/2003 | Shibata et al. ............. 296/37.8 |
| 6,652,128 B1 | 11/2003 | Misaras |
| 6,656,397 B1 | 12/2003 | Hansen et al. |
| 6,669,258 B1 * | 12/2003 | Kato ......................... 296/37.9 |
| 6,695,691 B1 | 2/2004 | Le |
| 6,702,354 B1 | 3/2004 | Galijasevic ................ 296/37.1 |
| 6,820,921 B1 * | 11/2004 | Uleski ...................... 296/37.9 |
| 6,883,680 B1 * | 4/2005 | Hirose ..................... 296/37.12 |
| 6,918,502 B1 * | 7/2005 | Overholt et al. ............... 220/6 |
| 2001/0030871 A1 | 10/2001 | Anderson, Jr. et al. |
| 2001/0053082 A1 | 12/2001 | Chipalkatti et al. |
| 2002/0043861 A1 | 4/2002 | Meadows .............. 297/411.21 |
| 2002/0066972 A1 | 6/2002 | Fritsch ...................... 264/46.4 |
| 2003/0002273 A1 | 1/2003 | Anderson, Jr. et al. |
| 2003/0075944 A1 | 4/2003 | Galijasevic ................ 296/37.1 |
| 2003/0080131 A1 * | 5/2003 | Fukuo ..................... 296/37.12 |
| 2003/0206985 A1 | 11/2003 | Gedritis et al. ............. 425/130 |
| 2004/0017687 A1 | 1/2004 | Misaras |
| 2004/0216753 A1 * | 11/2004 | Fox ............................ 131/242 |

FOREIGN PATENT DOCUMENTS

| | | |
|---|---|---|
| FR | 2589111 | 4/1987 |
| JP | 11268574 | 10/1999 |
| WO | 2005/068154 | 7/2005 |

* cited by examiner

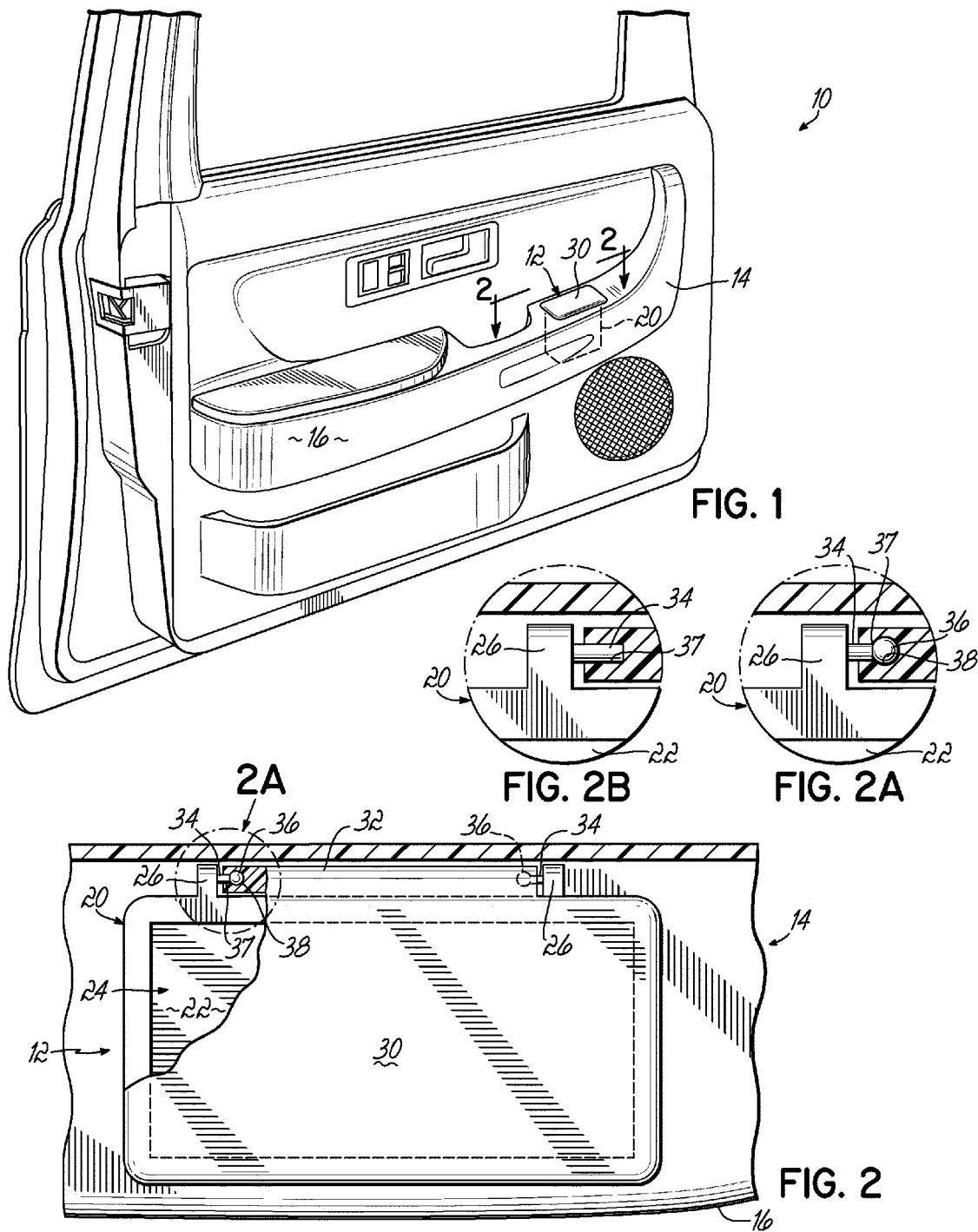

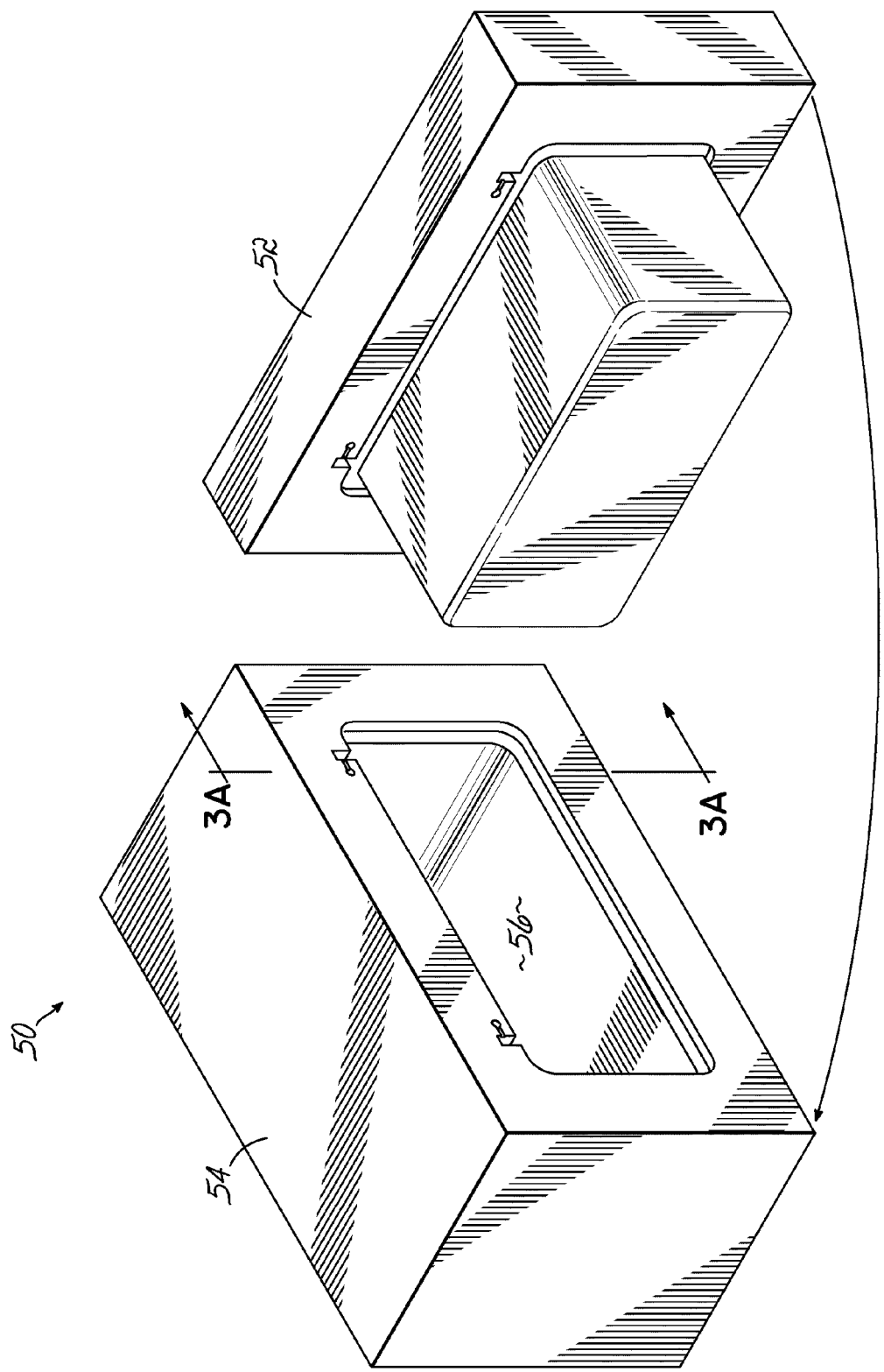

AUTOMOTIVE ASHTRAY AND METHOD FOR MAKING THE SAME

The present invention is related to U.S. Ser. No. 10/708,561, filed Mar. 11, 2004, U.S. Ser. No. 10/710,497, filed Jul. 15, 2004, U.S. Ser. No. 10/710,498, filed Jul. 15, 2004 and U.S. Ser. No. 10/711,652, filed Sep. 29, 2004.

FIELD OF THE INVENTION

The present invention pertains generally to compartments for automotive interiors and more particularly to an ashtray for automotive interiors, and a method for making the same.

BACKGROUND OF THE INVENTION

It is known to provide automotive interiors with various trim assemblies to improve the comfort and convenience of vehicle occupants and for the aesthetic appearance of the automotive interior. Examples of these interior trim assemblies include the instrument panels, armrests, door panels, and consoles. In many of these assemblies, various compartments are incorporated therein that allow the vehicle occupant to conveniently store items, e.g. coins, tissue, maps, cigarette or cigar butts, and the like, for later removal or disposal thereof.

In certain compartments, such as for some ashtray compartments, it is desirable for the compartment to include a cover that overlies the opening and is adapted to secure or contain the items therein. This cover is typically attached to a compartment body, such as by a hinge mechanism, so that the cover can be pivotally opened and closed as desired by the vehicle occupant. While covered compartments can be desirable by car owners and vehicle occupants, current covered compartments have some drawbacks.

The primary drawback is in the manufacturing and assembly of the parts for these compartments. The current process for making a compartment, such as an automotive ashtray, typically includes forming the ashtray body in a first mold. The ashtray cover then is individually formed in a second and separate mold. A further separate connecting member, usually a pair of metal or plastic cylindrical hinge pins, then is used to couple the cover to the body. Moreover, current ashtrays may include a pair of damping mechanisms to provide some resistance to opening and closing the cover to the compartment. The as-formed ashtray may then be inserted into the various trim assemblies in the automobile.

Thus, under current manufacturing processes, automotive ashtrays comprise several different parts each having different part numbers that must all be appropriately supplied, tracked, shipped, inventoried and eventually assembled to make the complete product. These multiple part assemblies in turn lead to significant administrative and labor costs, which increase the overall costs of production.

There is thus a need for an improved automotive ashtray and a method for making the same that reduces the number of parts and the labor required for assembly thereof thereby reducing overall manufacturing costs.

SUMMARY OF INVENTION

The present invention provides for an improved automotive ashtray having a reduced number of parts and that is adapted to be coupled to an interior trim assembly, e.g. a door panel, of a vehicle.

To this end, the ashtray includes a first member, which is either a compartment body or cover, having at least one connecting member integrally formed therein made from a first material. The ashtray further includes a second member, which is the other of the compartment body or cover, having at least one connecting member integrally formed therein and made from a second material different from the first material. The first and second materials can include thermoplastic materials with one of the materials having a higher melting point than the other. The at least one first member connecting member includes at least one projecting portion and the at least one second member connecting member includes at least one receiving portion that receives the at least one projecting portion. As such, the body as well as the cover is an integrated, unitary structure. The compartment body further defines a cavity having an opening and being adapted to store one or more items such as coins, cigarette or cigar butts and ashes, and the like. The projecting and receiving portions accordingly are pivotally coupled together so that the ashtray cover can be opened and closed to allow access to the cavity.

In an exemplary embodiment, the ashtray includes a compartment body defining a cavity having an opening and adapted to store one or more items such as coins, cigarette or cigar butts and ashes, and the like. The compartment body further includes an integrated pair of spaced apart connecting members with each having a projecting portion extending therefrom. Each projecting portion defines a pin having an enlarged distal end defining a circular portion. The cover similarly includes an integrated connecting member having a pair of spaced apart receiving portions with each defining a bore having an enlarged receiving end defining a circular recess. Each recess receives one of the circular portions to couple the cover to the compartment body such that the cover is pivotally moveable between an open position, wherein the cavity is accessible through the opening, and a closed position, wherein the cover overlies the opening. Advantageously, the compartment body is composed of a polycarbonate/acrylonitrile butadiene styrene to be heat resistant to lit cigars and cigarettes. The cover advantageously may be polypropylene, polyoxymethylene, or polyamide 6.

The automotive ashtray is formed by a two shot molding operation. In a first shot of the molding operation, the first material is injected into a mold to form the first member, i.e., the compartment body or cover, having the at least one integrated connecting member that includes the at least one projecting portion extending therefrom. Next, a mold chamber is formed about at least a portion of the first member, and more specifically, about a portion of the at least one projecting portion. After the first member has been allowed time sufficient to cure, the second material is injected into the mold chamber in a second shot of the molding operation to form the second member, i.e., the other of the body or cover, having the at least one integrated connecting member that includes the at least one receiving portion. The second material has a lower melting point than the first material to avoid fusion of the receiving portion to the projection portion. Accordingly, the at least one receiving portion overmolds the at least one projecting portion so that the compartment body and cover are pivotally coupled together. After the second material has been allowed time sufficient to cure, the ashtray is ready to be received within an automotive trim assembly, such as a door panel.

By virtue of the foregoing, there is thus provided an improved automotive ashtray having a reduced number of parts and that is adapted to be coupled to a substrate for use as an interior trim assembly in a vehicle.

The features and objectives of the present invention will become more readily apparent from the following Detailed Description taken in conjunction with the accompanying drawings.

BRIEF DESCRIPTION OF DRAWINGS

The accompanying drawings, which are incorporated in and constitute a part of this specification, illustrate embodiments of the invention and, together with a general description of the invention given above, and the detailed description given below, serve to explain the invention.

FIG. 1 is a perspective view of an automotive door trim assembly including an embodiment of the ashtray of the present invention within a door trim panel;

FIG. 2 is a top plan view of the trim assembly of FIG. 1 showing a cut-away portion of the ashtray to illustrate the coupling between the cover and compartment body;

FIG. 2A is an enlarged view of the incircle portion 2A showing the coupling between the cover and compartment body of FIG. 2;

FIG. 2B is a figure similar to FIG. 2A showing another embodiment of the present invention;

FIG. 3 is a perspective view of a mold used to form the compartment body of the ashtray of the present invention;

DETAILED DESCRIPTION

Figure 3A:
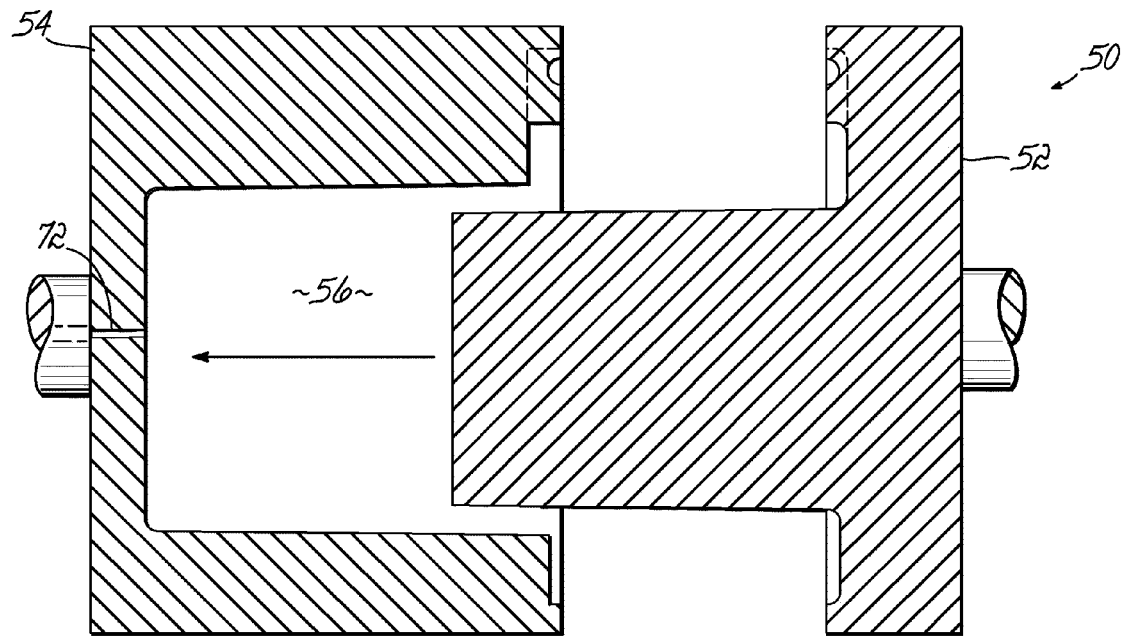
FIG. 3A is the first in a series of sequential cross-sectional views of the mold of FIG. 3 taken along the lines 3A—3A illustrating the first shot of the molding operation of the ashtray.

In FIG. 1, there is shown an interior trim assembly, i.e., a door panel 10, for an automobile (not shown) including an embodiment of the automotive ashtray 12 of the present invention within a substrate 14 of the door panel 10. The door panel assembly 10 covers a portion of the interior of the automobile to provide a more aesthetically pleasing environment, as well as additional comfort to the vehicle's occupants. The other various trim assemblies, such as instrument panels, armrests, door panels, or consoles, generally are constructed in a similar fashion. Thus, while the following detailed description focuses on the ashtray 12 being included in a door panel 10, those having ordinary skill in the art will recognize that the ashtray 12 may equally be incorporated in other automotive trim assemblies.

With further reference to FIGS. 1 and 2, the door panel 10 includes a relatively rigid substrate 14, which receives the ashtray 12 and which forms at least a portion of the structural support and defines the general shape of the door panel assembly 10. The door panel 10 may be secured in the interior of the automobile, for example, by a bracket or mounting member (not shown) as is known in the art. The door panel 10 further includes a front surface 16 that faces the interior of the automobile and a back surface (not shown) opposite the front surface 16 that is hidden from view when the panel assembly 10 is mounted to the automobile.

Figure 4:
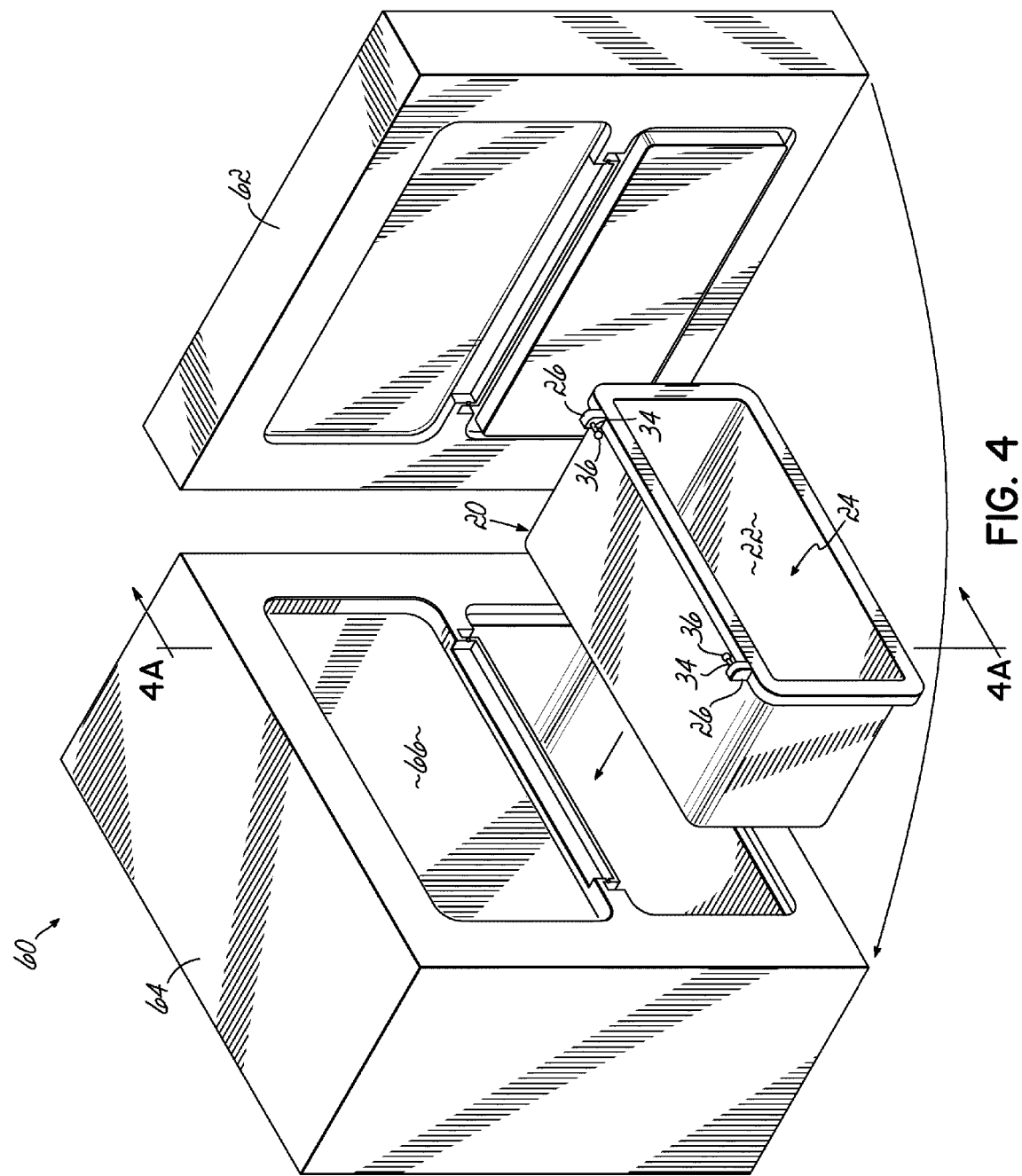
FIG. 4 is a perspective view of a mold used to form the cover of the ashtray.

As best shown in FIGS. 2, 2A and 4, the ashtray 12 includes a compartment body 20 defining a cavity 22 having an opening 24 for gaining access to the cavity 22. The cavity 22 is adapted to store one or more items such as coins, cigarette or cigar butts and ashes, and the like. The compartment body 20 further includes a pair of spaced apart connecting members 26 integrally formed therein. While two connecting members 26 are shown in FIGS. 2 and 4, it should be understood by the artisan that one connecting member or more than two connecting members may be provided integrally formed with the compartment body 20. The compartment body 20 is made of a thermoplastic material such as a thermoplastic synthetic resin, advantageously polycarbonate/acrylonitrile butadiene styrene to be heat resistant to lit cigars and cigarettes.

Figure 5:
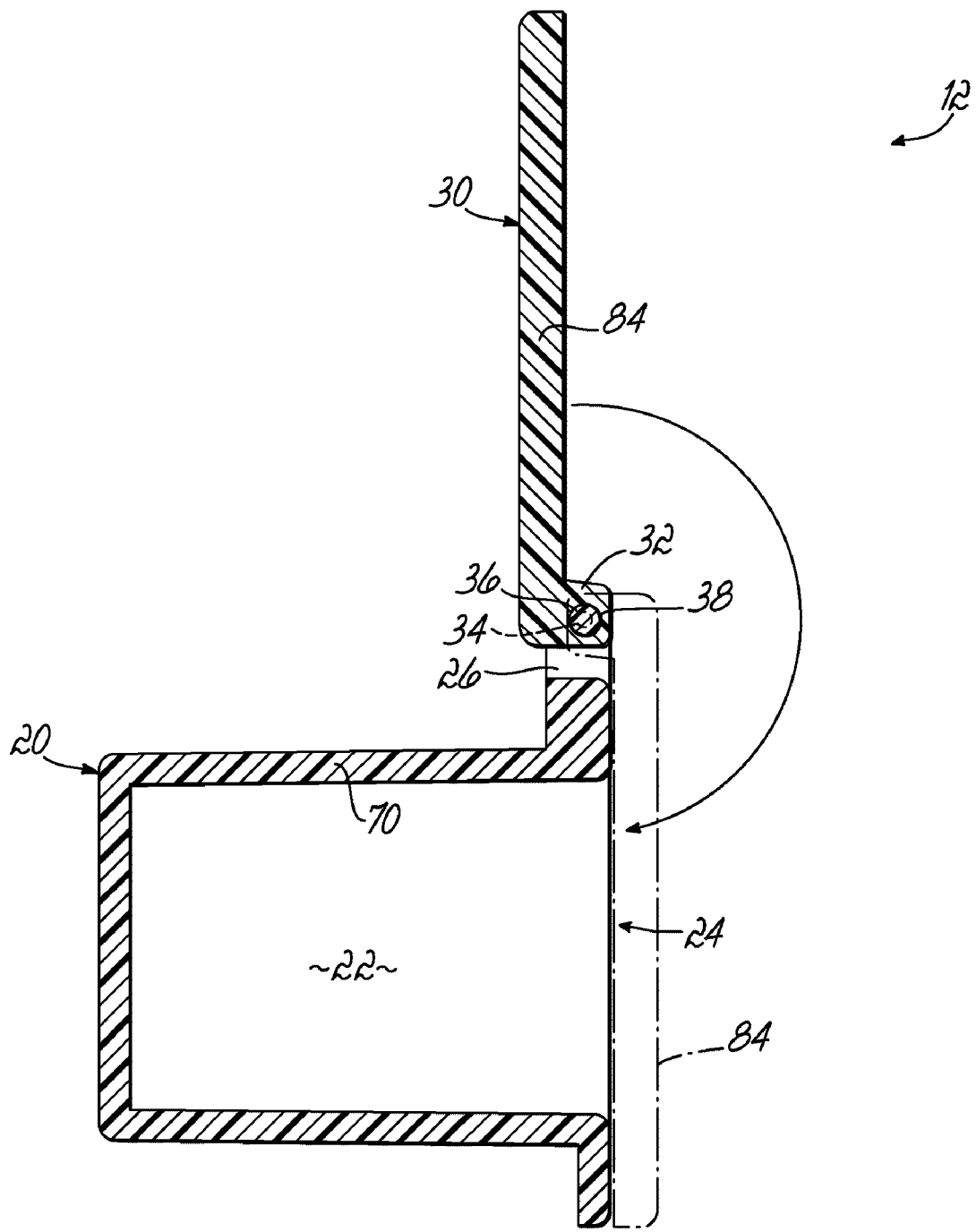
FIG. 5 is a cross-sectional view of the ashtray of FIG. 4B removed from the mold and showing the cover in an open and closed position.

As best shown in FIGS. 2 and 5, the ashtray 12 also has a cover 30 including one connecting member 32 integrally formed therein. It similarly should be understood by the artisan that more than one connecting member 32 may be provided integrally formed with the cover 30. The cover 30 is made of a thermoplastic material such as a thermoplastic synthetic resin, advantageously polypropylene, polyoxymethylene, or polyamide 6, and further has a different melting point from the material of the body 20. Advantageously, the cover material includes a lower melting point than the compartment body material.

With further reference to FIGS. 2 and 2A, each integral connecting member 26 of the body 20 includes a projecting portion defining a pin 34 having an enlarged distal end defining a circular portion 36. The integral connecting member 32 of the cover 30 includes a pair of spaced apart receiving portions defining a bore 37 having an enlarged receiving end defining a circular recess 38. Accordingly, the connecting members 26 of the body 20 cooperate with the connecting member 32 of the cover 30 to couple the cover 30 to the compartment body 20, and more specifically, each recess 38 receives one of the circular portions 36 to pivotally couple the cover 30 to the compartment body 20 such that the cover 30 is moveable, as shown in FIG. 5, between an open position, wherein the cavity 22 is accessible through the opening 24, and a closed position, wherein the cover 30 overlies the opening 24.

It should be understood that the projecting portions 34 and receiving portions 37 can comprise any multitude of desired shapes and sizes for pivotally coupling together the body 20 and cover 30. By way of example, FIG. 2B shows another embodiment of the ashtray 12 wherein the pin 34 is devoid of the circular portion 36 while the corresponding bore 37 similarly is devoid of the recess 38. Accordingly, the bore 37 receives the pin 34 to pivotally couple the cover 30 to the compartment body 20. It also should be understood that the body connecting members 26 may include more that one projecting portion 34 and the cover connecting member 32 may include any number of corresponding receiving portions 37. It is further understood that the cover 30, alternatively, could be provided with one or more projecting portions 34 while the compartment body 20, alternatively, could be provided with one or more integrated receiving portions 37.

The ashtray 12 further may include one or more hinge springs (not shown) cooperating with the body 20 and the cover 30 to assist with movement of the cover 30 from the open position to the closed position.

With reference to FIGS. 3–5, a method of making the ashtray 12 of the present invention will now be described. More specifically, the ashtray 12 is formed by a two-shot molding operation wherein a first shot molds one of either the compartment body 20 or the cover 30, and wherein a second shot molds the other of the body 20 or cover 30 to couple the parts together. To this end, in FIG. 3, a first mold 50 is shown including a top portion 52 and a bottom portion 54 defining a first cavity 56 adapted to mold a first member, i.e., the compartment body 20, in a first shot. In FIG. 4, a second mold 60 is shown including a top portion 62 and bottom portion 64 defining a cavity 66 adapted to mold a second member, i.e., the cover 30, in a second shot. While the first and second molds 50, 60 are illustrated separately, it should be understood that the first and second molds 50, 60 may be provided together in a single mold assembly as is well known in the art.

Figure 3B:
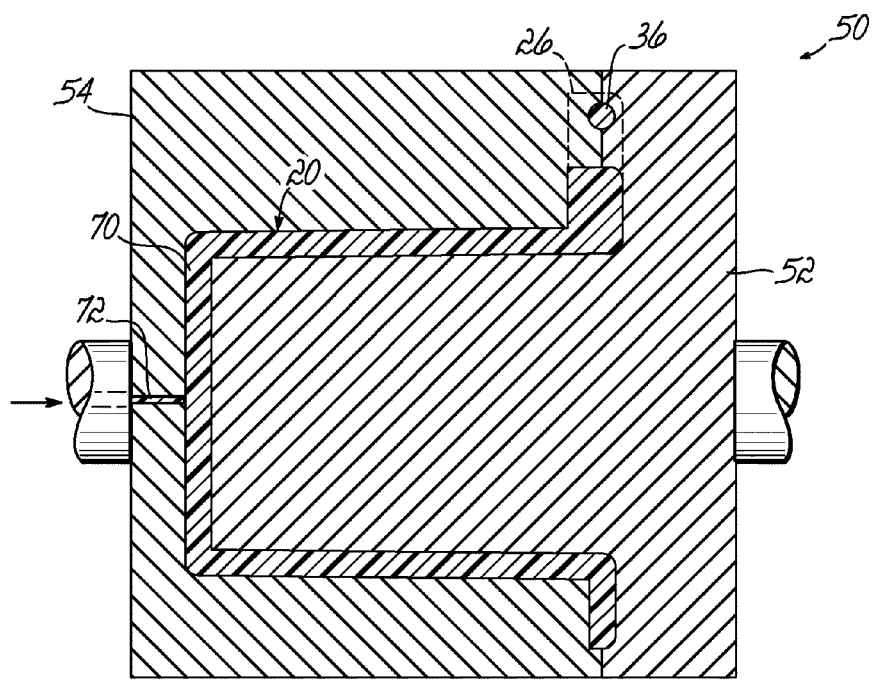
FIG. 3B is the second in this series of cross-sectional views.

As best shown in FIGS. 3A and 3B, to mold the compartment body 20, the first mold 50 is closed and a first curable material 70 is injected through a channel 72, in a first shot, into the space formed between the top and bottom portions 52, 54. The first curable material 70 advantageously is a thermoplastic material such as a thermoplastic synthetic resin, and more advantageously a heat resistant material such as polycarbonate/acrylonitrile butadiene styrene. The injected material 70 is allowed sufficient time to cure to form the compartment body 20.

As best shown in FIGS. 3B and 4, the molded body 20 defines the cavity 22 having the opening 24 for gaining access thereto. This cavity 22 is adapted to store one or more items such as coins, cigarette or cigar butts and ashes, and the like. The compartment body 20 further includes the pair of integrally formed, spaced apart connecting members 26 with each having the projecting portion extending therefrom defining the pin 34 having the enlarged distal end defining the circular portion 36.

With further reference to FIG. 4, after the body 20 is molded in FIG. 3B, the body 20 is moved from the first mold 50 to the bottom portion 64 of the second mold 60. Movement of the body 20 to the second mold 60 can occur by methods commonly known in the art such as by hand, i.e., manually, by robotic means, or by utilizing a rotating mold assembly. With respect to the rotating mold assembly (not shown), the first member, e.g. the body, may be formed in a first mold as stated above. The mold is then opened and the first member, rather than being manually or robotically moved, is rotated, e.g. 180 degrees, on a rotating platen to coordinate with a second mold to form the second member, e.g. the cover. The rotating mold assembly advantageously allows for simultaneous molding of first and second members.

Figure 4A:
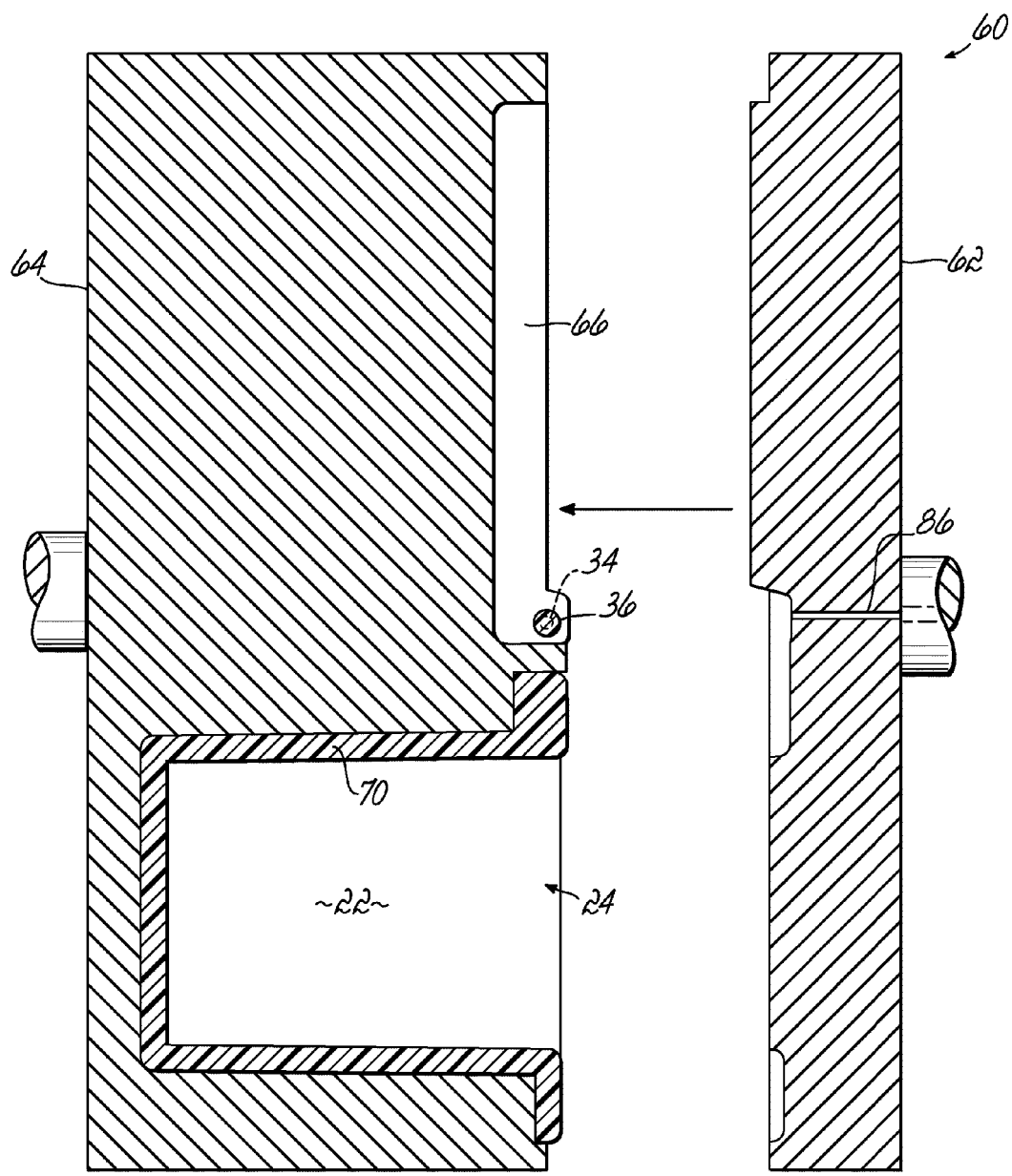
FIG. 4A is the first in a series of sequential cross-sectional views of the mold of FIG. 4 taken along the lines 4A—4A illustrating the second shot of the molding operation of the ashtray.
Figure 4B:
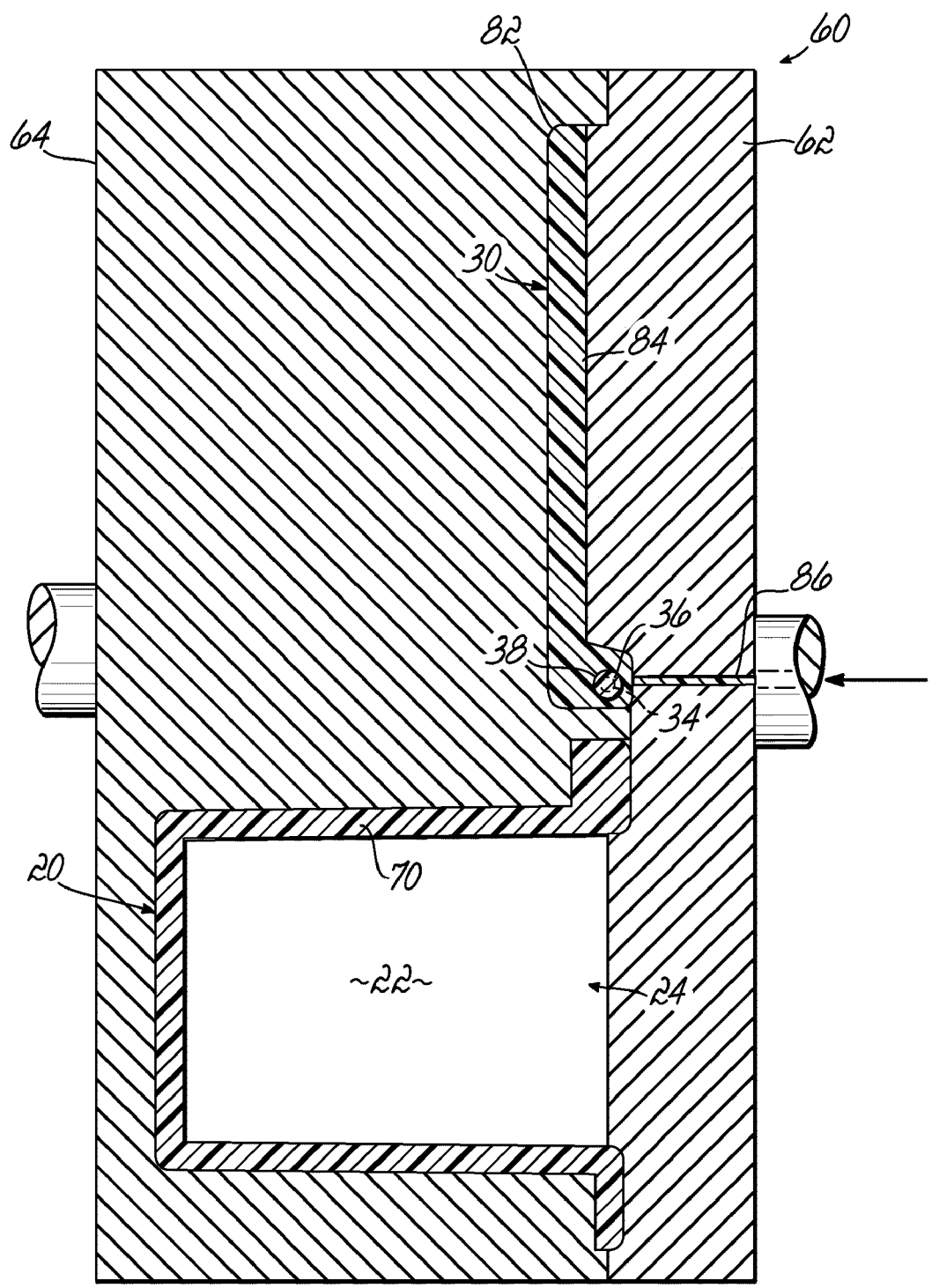
FIG. 4B is the second in this series of cross-sectional views.

As best shown in FIGS. 4, 4A, and 4B, after the body 20 has been moved to the second mold 60, a portion of the connecting members 26, and more specifically, a portion of the projecting portions 34 are received within the cavity 66 of the second mold 60 that is adapted to mold the cover 30. Notably, the second mold 60 is closed to form a mold chamber 82 about the portion of the projecting portions 34. A second curable material 84 then is injected through a channel 86, in a second shot, into the space, i.e. the mold chamber 82, formed between the top and bottom portions 62, 64. This second curable material 84 has a lower melting point than the first curable material 70. Accordingly, the second material 84 is provided at a lower temperature than the melting point of the first material 70 so as to avoid fusion of the recess 38 to the circular portion 36. The second material 84 advantageously is a thermoplastic material such as a thermoplastic synthetic resin, and more advantageously polypropylene, polyoxymethylene, or polyamide 6.

As further shown in FIGS. 4B and 5, the injected material 84 is allowed sufficient time to cure to form the cover 30 at a position 180 degrees relative to the body 20. After the ashtray 12 is formed, the mold 60 may be opened and the ashtray 12 ejected therefrom. Accordingly, the cover 30 includes the integrally formed connecting member 32 including the pair of spaced apart receiving portions defining the bore 37. Each bore 37 has the enlarged receiving end defining the circular recess 38 being over-molded the circular portions 36 so that the compartment body 20 and cover 30 are pivotally coupled together. As best shown in FIG. 5, the cover 30 of the formed ashtray 12 is moveable between the open position, wherein the cavity 22 is accessible through the opening 24, and the closed position, wherein the cover 30 overlies the opening 24. Notably, the first and/or second curable materials 70, 84 further may be selected based upon a desired shrinkage property to provide for varying degrees of friction between the projecting portions 34 and receiving portions 37 to alter the ease with which the cover 30 may be opened and closed.

One or more hinge springs (not shown) further may be provided to cooperate with the body 20 and the cover 30 to assist with movement of the cover 30 from the open position to the closed position.

Advantageously, the molding operation of the present invention may be continuously performed utilizing a single mold assembly to provide an improved automotive ashtray. The molded ashtray 12, as shown in FIG. 1, now may be received within the substrate 14 of the door panel assembly 10. Those having ordinary skill in the art will recognize that the ashtray 12 may equally be included in the substrates of other automotive trim assemblies, e.g. instrument trim panels, rear passenger side panels, center consoles and others.

Although the above method has described molding the first member as the body 20 and molding the second member as the cover 30, it should be understood that the cover 30, alternatively, could be molded as the first member while the compartment body 20, alternatively, could be molded as the second member. It is further understood that the receiving portions 37, alternatively, may be formed with the first member while the projecting portions 34 alternatively may be formed with the second member.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. An automotive interior trim assembly, comprising:
   a substrate; and
   an ashtray coupled to said substrate and adapted to store one or more items, said ashtray comprising:
      a compartment body defining a cavity and having an opening for gaining access to said cavity, said compartment body including at least one body connecting member integrally formed therein made from a first material; and a cover including at least one cover connecting member integrally formed therein and made from a second material having a different melting point from said first material, said at least one body connecting member cooperating with said at least one cover connecting member to couple said cover to said compartment body, a portion of either said at least one body connecting member or said at least one cover connecting member being molded over a corresponding portion of said at least one body or cover connecting member, said cover being moveable between an open position, wherein said cavity is accessible through said opening, and a closed position, wherein said cover overlies said opening.

2. The trim assembly of claim 1, wherein said at least one body connecting member comprises at least one projecting portion extending therefrom, and wherein said at least one cover connecting member comprises at least one receiving portion therein which receives said at least one projecting portion.

3. The trim assembly of claim 2, wherein said at least one projecting portion defines a pin.

4. The trim assembly of claim 2, wherein said at least one receiving portion defines a bore.

5. The trim assembly of claim 1, wherein said at least one body connecting member includes a pair of spaced apart connecting members, each said pair of spaced apart connecting members having at least one projecting portion defining a pin having an enlarged distal end defining a circular portion, and wherein said at least one cover connecting member includes one connecting member, said cover connecting member including a pair of spaced apart receiving portions with each defining a bore having an enlarged receiving portion defining a circular recess, each said recess receiving one of said circular portions to couple said cover to said compartment body.

6. The trim assembly of claim 1, wherein said cover is pivotally movable between said open and closed position.

7. The trim assembly of claim 1, wherein said first material is polycarbonate/acrylonitrile butadiene styrene and the second material is selected from the group consisting of polypropylene, polyoxymethylene, and polyamide 6.

8. The trim assembly of claim 1, wherein said first material has a higher melting point than said second material.

9. The trim assembly of claim 1 configured as a door panel.

\* \* \* \* \*